United States Patent [19]

Harloff et al.

[11] Patent Number: 4,474,395
[45] Date of Patent: Oct. 2, 1984

[54] BUMPER FOR A MOTOR VEHICLE

[75] Inventors: Bernd Harloff, Böblingen; Roman Schöppel, Sindelfingen; Ulrich Bruhnke; Engelbert Kinds, both of Ehningen, all of Fed. Rep. of Germany

[73] Assignee: Daimler-Benz Aktiengesellschaft, Fed. Rep. of Germany

[21] Appl. No.: 393,596

[22] Filed: Jun. 30, 1982

[30] Foreign Application Priority Data

Jun. 30, 1981 [DE] Fed. Rep. of Germany ....... 3125650

[51] Int. Cl.³ .............................................. B60R 19/06
[52] U.S. Cl. .................................... 293/120; 293/136
[58] Field of Search .............. 293/120, 121, 122, 132, 293/133, 135, 136

[56] References Cited

U.S. PATENT DOCUMENTS

| | | | |
|---|---|---|---|
| 4,027,909 | 6/1977 | Hauraux | 293/121 |
| 4,072,334 | 2/1978 | Seegmiller | 293/122 |
| 4,073,528 | 2/1978 | Klie | 293/122 |
| 4,328,986 | 5/1982 | Weller | 293/136 |

FOREIGN PATENT DOCUMENTS 3021016 12/1980 Fed. Rep. of Germany ...... 293/136

Primary Examiner—Robert R. Song
Attorney, Agent, or Firm—Craig & Burns

[57] ABSTRACT

A bumper for a motor vehicle, with the bumper being equipped with an energy absorber provided along a rear surface thereof with at least one recess. The energy absorber is disposed forwardly of a girder subjected to bending, with the girder being attached to a vehicle. The recesses are arranged in such a manner that an impact force is transmitted to the body of the motor vehicle with as little moment as possible so as to prevent a tilting of the bumper and associated motor vehicle parts such as a fender of the vehicle. With a bumper girder subjected to bending being mounted forwardly of the energy absorber, at least portions of the recesses diagonally face the area of incidence of the impact force. If the impact is directly incident on the energy absorber, the recesses lie in an extension of a direction of the point of application of the impact forces.

4 Claims, 2 Drawing Figures

BUMPER FOR A MOTOR VEHICLE

BACKGROUND OF THE INVENTION

The present invention relates to a bumper and, more particularly, to a bumper for a motor vehicle, with the bumper including a foam energy absorber mounted forwardly of a girder attached to the vehicle, with the girder being adapted to be subjected to a bending force, wherein recesses are provided in the foam energy absorber beginning from a rear wall in proximity to the girder.

In, for example, U.S. Pat. No. 4,072,334, a bumper of the aforementioned type is proposed wherein recesses are surrounded by foam except for a rear wall side opening. In this proposed construction, a force passes through crosspieces which delineate the recesses until the foam is compressed to the extent that a base of the recesses near the point of impact rest against the girder. The uniform foam distribution and orderly cross-sectional configuration make it possible for the bumper to be uniformly depressed in case of an application of an impact force.

In, for example, Offenlegungsschrift No. 3,021,016, a further bumper construction is proposed wherein individual foam energy absorbers are provided and mounted on a girder attached to a motor vehicle.

There are also bumper constructions which, for example, have an irregular cross sectional configuration for stylistic or aerodynamic reasons so that the impact force is applied on a projecting upper or lower portion of the bumper is particularly disadvantageous in the fact that there is a danger that the bumper will tilt due to the eccentric load occasioned by the impact force.

SUMMARY AND OBJECTS OF THE INVENTION

The aim underlying the present invention essentially resides in providing a bumper arrangement which, while retaining recesses near the support girder, will nevertheless allow the bumper to be compressed in a parallel manner relative the support girder, even in case of an eccentrically applied impact load, so that the body of the vehicle is not prematurely raised.

In accordance with advantageous features of the present invention, a bumper for a motor vehicle with a foam energy absorber is provided with the foam energy absorber being mounted forwardly of a girder which is subjected to bending and is attached to the vehicle. Starting at a rear wall of the foam energy absorber disposed in proximity to the girder, the bumper is provided with at least one recess located outside with respect to a horizontal midplane of the bumper such that an impact force area also lies outside of the horizontal midplane. In the case of a force of impact directly on the energy absorber, the recesses lie in an extension of the direction of the application of the impact force.

It is also possible in accordance with the present invention for the girder of the bumper adapted to be subjected to bending forces to be mounted forwardly of the energy absorber with recesses lying diagonally opposite the area of the point of impact.

It is also possible for the recesses to be arranged, with respect to an area subject to an impact force, outside a center longitudinal plane of the bumper such that, in case of a direct impact on the energy absorber, the recesses lie in the direction of the impact and a face area of the shock attack diagonally in the case of the girder mounted forwardly of the energy absorber.

Accordingly, it is an object of the present invention to provide a bumper for a motor vehicle which avoids, by simple means, shortcomings and disadvantages encountered in the prior art.

Another object of the present invention resides in providing a bumper for a motor vehicle which is simple in constuction and therefore relatively inexpensive to manufacture.

Yet another object of the present invention resides in providing a bumper for a motor vehicle which allows the bumper to be compressed in parallel even in the case of an eccentrically applied load.

A still further object of the present invention resides in providing a bumper for a motor vehicle which prevents the development of an unfavorable moment on a holder or supports of a girder supporting the bumper.

These and other objects, features, and advantages of the present invention will become more apparent from the following description when taken in connection with the accompanying drawing which shows, for the purposes of illustration only, two embodiments in accordance with the present invention, and wherein:

DESCRIPTION OF THE PREFERRED EMBODIMENTS

Figure 1:
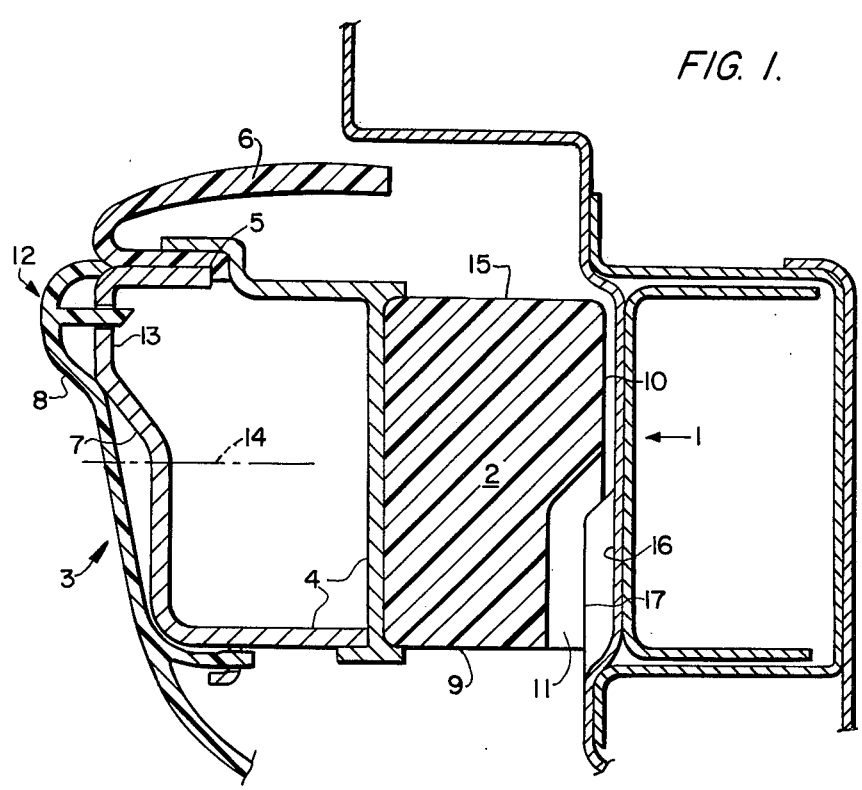
FIG. 1 is a cross sectional view of a bumper constructed in accordance with the present invention wherein a bumper girder, subject to bending, is mounted forwardly of an energy absorber.

Referring now to the drawing wherein like reference numerals are used in both views to designate like parts and, more particularly, to FIG. 1, according to this figure, the front or rear section of a motor vehicle, not shown in great detail, has a girder generally designated by the reference numeral 1, adapted to be subjected to bending forces, supported on longitudinally extending supports or frame members of the vehicle, and a bumper generally designated by the reference numeral 3 equipped with an energy absorber 2. The energy absorber 2 is mounted at a distance forwardly or rearwardly, depending upon the disposition of the bumper 3 at the front or rear of the motor vehicle, of the girder 1. While the bumper 3, in FIG. 1, is illustrated as being mounted on the motor vehicle, as can readily be appreciated, the bumper 3 may be supported on the longitudinal girders or frame members at a distance from a front or rear end of the vehicle. A space, which can take the form of recesses or grooves 11 and which will be discussed later, between the energy absorber 2 and girder 1 can then be provided if a bumper girder 4, adapted to be subjected to bending stress, is mounted forwardly of the energy absorber 2 which is mounted on the girder 1 in a conventional manner.

The bumper girder 4 is of a bipartite construction and accommodates, on an upper side or surface portion 5 thereof, a profiled cover member 6 and a further covering member 8 at a front side or surface portion 7 thereof, with the further covering member 8 taking the form of an elastic skirt. Recesses or grooves 11 are formed in a corner of the energy absorber 2 between an underside or surface 9 and a rear side or surface 10. The recess or grooves 11 are configured such that at least a portion thereof extends diagonally facing a shock or impact area generally designated by the reference numeral 12, which is essentially formed by a profiled cross-section 13 of the bumper girder 4. Consequently, at a beginning of an application of an impact force, any tipping or tilting of the bumper 3 is prevented, and the bumper 3 compresses in parallel due to the weaknesses caused by the presence of the recesses 11, although the impact or shock area 12 is far above a center longitudinal plane 14 of the bumper 3.

It is also possible to provide a bumper construction capable of absorbing an impact or shock force at a position below the longitudinal center plane 14. In such a bumper construction, the recess or grooves 11 are displaced upwardly and lie in a corner region of the energy absorber between an upper side 15 and rear side 10 of the energy absorber 2.

In order to provide for a reinforcing of the girder 1 attached to the vehicle, reinforcing projections 17 may be formed on a front side 16 of the girder 1 adjoining the recesses 11, with the reinforcing projections 17 being capable of accommodating the impact or shock forces equally in situations wherein the impact or shock force is obliquely applied.

Figure 2:
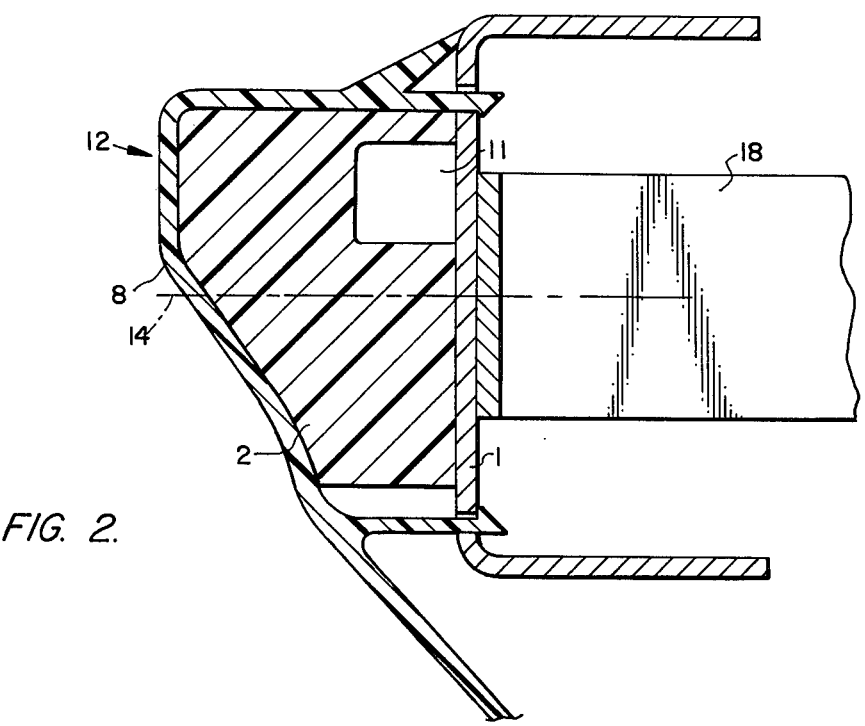
FIG. 2 is a cross sectional view of another construction of a bumper arranged in accordance with the present invention wherein shock or impact forces directly strike an energy absorber.

As shown in FIG. 2, the energy absorber may be mounted directly forwardly or rearwardly of the girder, depending upon the disposition of the bumper on the motor vehicle, with the energy absorber 2 being fastened to the girder by a covering 8'. Recesses or grooves 11 are spaced outside of an impact or shock area 12 so that, in case of stress, the cross sectional area of the energy absorber 2, weakened by the shock or impact forces, is deformed without an occurrence of an unfavorable moment on the longitudinally extending holder or girder 18 supporting the girder 1 or associated vehicle body structures.

In the construction as shown in FIG. 2, as deformation of the energy absorber 2 increases, the impact or shock area 12 creeps downwardly as the load increases so that the moment or tendency to tilt becomes less and less.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A bumper for a motor vehicle, the bumper being adapted to be connected to a girder means attached to the motor vehicle and including a foam energy absorber means mounted on the girder means, comprising at least one recess means on a rear side of the foam energy absorber means facing the girder means, the at least one recess means disposed at a position outside of an area of a longitudinally extending horizontally disposed center plane of the bumper, the recess means lying in an extension of a direction of an impact force acting on the bumper from an area outside of the center plane of the bumper.

2. A bumper according to claim 1, wherein a bumper girder means is disposed forwardly of the foam energy absorber means, and at least portions of the recess means extend diagonally with respect to an impact area of the impact force on the bumper.

3. A bumper according to claim 2, wherein the bumper girder means is of a bipartite construction and is adapted to be subjected to bending stresses, a profiled cover means is mounted on an upper surface of the bumper girder means, and an elastic skirt means is mounted on the front surface of the bumper girder means.

4. A bumper according to one of claims 1, 2 or 3, wherein the at least one recess means is disposed in a corner of the energy absorber means between an underside and a rear side of the energy absorber means, whereby tipping of the bumper is prevented when an impact force is applied to an area above the center plane.

* * * * *